United States Patent [19]
Middleton

[11] 4,093,024
[45] June 6, 1978

[54] HEAT EXCHANGER EXHIBITING IMPROVED FLUID DISTRIBUTION

[75] Inventor: Verne L. Middleton, East Alton, Ill.

[73] Assignee: Olin Corporation, New Haven, Conn.

[21] Appl. No.: 696,203

[22] Filed: Jun. 15, 1976

[51] Int. Cl.² .................. F28F 3/12; F28F 9/22; F28F 27/02; F24J 3/02
[52] U.S. Cl. .................. 165/170; 29/157.3 V; 126/271; 165/174
[58] Field of Search ............ 29/157.3 V; 165/170, 165/174, 146; 126/271

[56] References Cited

U.S. PATENT DOCUMENTS

| | | | |
|---|---|---|---|
| 1,748,121 | 2/1930 | Gay | 165/174 |
| 1,893,270 | 1/1933 | Caldwell | 165/174 |
| 1,915,805 | 6/1933 | Sutcliffe | 165/174 |
| 2,310,234 | 2/1943 | Haug | 165/174 |
| 2,690,002 | 9/1954 | Grenell | 29/157.3 V |
| 2,707,868 | 5/1955 | Goodman | 165/174 |
| 2,864,588 | 12/1958 | Booth et al. | 165/174 |
| 3,066,389 | 12/1962 | Jaeger | 29/157.3 V |
| 3,073,575 | 1/1963 | Schulenberg | 165/174 |
| 3,196,943 | 7/1965 | Haerter | 165/174 |
| 3,239,000 | 3/1966 | Meagher | 126/271 |
| 3,334,398 | 8/1967 | Middleton | 29/157.3 V |
| 3,545,538 | 12/1970 | Hinnant | 29/157.3 V |
| 4,038,970 | 8/1977 | D'Ascoli et al. | 165/144 X |

*Primary Examiner*—Charles J. Myhre
*Assistant Examiner*—Sheldon Richter
*Attorney, Agent, or Firm*—Paul Weinstein; Robert A. Dawson

[57] ABSTRACT

A heat exchange system comprising a plurality of passageways for a heat exchange medium defining opposed header structures connected by connecting portions of said passageways extending therebetween, said connecting portions having entry and exit portions communicating with said headers to provide ingress and egress openings for said heat exchange medium, wherein said connecting portions are provided with at least one constriction in internal diameter extending along at least a portion of the length of at least one of said connecting portions, said constriction serving to regulate the flow of said heat exchange medium between all of said connecting portions.

17 Claims, 13 Drawing Figures

U.S.Patent   June 6, 1978   Sheet 3 of 3   4,093,024

HEAT EXCHANGER EXHIBITING IMPROVED FLUID DISTRIBUTION

BACKGROUND OF THE INVENTION

The present invention relates to heat exchange systems comprising a plurality of internal tubular passageways disposed in a spaced apart relation to each other, which possess utility in heat exchange applications wherein a heat exchange medium is circulated through the passageways. A particular application of such a system resides in devices utilizing solar energy, and specifically, solar energy absorbing devices for elevating fluid temperature.

It is well known that the radiation of the sun can be collected as a source of energy for heating or cooling or for direct conversion to electricity. Heating and cooling depend upon collection of rays of solar energy in a fluid heating transfer system. The heated fluid is pumped or allowed to flow to a place of utilization for the thermal energy it has acquired.

In certain areas of the world, solar energy is the most abundant form of available energy if it could be harnessed economically. Even in more developed areas of the world, the economic harnessing of solar energy would provide an attractive alternative to the use of fossile fuels for energy generation.

One of the problems attending the development of an efficient system for the conversion of solar energy resides with the structure and design of the solar energy absorbing device, or solar collector. This solar collector generally comprises a rectangular plate-like structure possessing channels or passageways for the circulation of the energy absorbing fluid medium. Conventionally, these panels have comprised a pair of opposed expanded passageways, known as headers, which are placed at opposite ends of the panel, and are connected by a plurality of tubular passageways which are often in parallel relation with respect to each other. These passageways, as well as the headers themselves, have generally been disposed at right angles with respect to each other and in parallel relation with respect to the horizontal and vertical dimensions, respectively, of the panel.

Difficulty encountered with known solar collectors relates to the uniformity of distribution of the heat exchange fluid through the several connecting tubular passageways lying between the headers. Though fluid would ideally pass through the individual connector tubes uniformly with respect to velocity, small variations in tube width, tube height and particular travel distance from header to header cause variations in flow rate due to pressure drop through the individual connector tubes. Such variations affect the flow rate and the heat collection rate of the connector tubes and the panel as a whole.

The above problem becomes particularly acute in the instance where collector systems comprising a plurality of panels, which may be placed in either parallel or serial relation to each other are employed. In such systems, the pressure drop experienced within the individual panels is compounded by the pressure drop and unequal flow occurring between the panels as fluid flows from the central manifold or header structure.

SUMMARY OF THE INVENTION

In accordance with the present invention, a heat exchanger is provided which possesses significantly improved efficiency, and specific utility in solar energy applications.

The present invention comprises a system of tubular passageways for a heat exchange medium defining opposed header structures connected by connecting portions of said passageways extending therebetween, said connecting portions having entry and exit portions communicating with said headers to provide ingress and egress openings for said heat exchange medium, wherein said connecting portions are provided with at least one constriction in internal diameter extending along at least a portion of the length of at least one of said connecting portions to assist in the distribution of flow of said heat exchange medium.

The system of the present invention may comprise a central inlet manifold or header structure which connects at one or more points to a plurality of connecting portions which may, in one embodiment, comprise individual heat exchange panels. The individual panels may define a wide variety of patterns of passageways including one or more entry or exit portions, wherein at least one constriction is provided along a portion of at least one of said entry or exit portions.

In a particular embodiment, the present invention may comprise a system of internal tubular passageways for a heat exchange medium, said internal passageways contained within an individual panel and disposed between spaced apart portions of the thickness of the panel to define opposed internal headers connected by internal connecting portions of said passageways extending therebetween. The internal passageways are provided with entry and exit portions extending from the headers to opposed edges of the panel in order to provide ingress and egress openings for the heat exchange medium. The internal connecting portions are modified by the provision of at least one constriction in internal diameter located on at least a portion of the length of at least one of said connecting portions which assists in maintaining uniform flow of heat exchange fluid through said connecting portions.

The system of the present invention exhibits improved fluid flow and heat exchange efficiency by the allocation of flow through the connecting portions achieved with the constrictions provided therein. The size, number and location of said constrictions may vary according to the size, disposition and number of the connecting portions employed.

As indicated above, the preferred embodiment of the present invention utilizes, as at least a part thereof, a metal panel having a system of internal fluid passageways, conventionally painted black, as will be described in more detail hereinbelow. The concepts of the present invention may, however, also be advantageously utilized in heat exchangers generally, such as, for example, using extrusions. Since the concepts of the present invention are particularly advantageous in metal penals having a system of internal fluid passageways, the present invention will be specifically described hereinbelow utilizing this type of system.

Accordingly, it is a principal object of the present invention to provide a heat exchange system which enables the efficient and economical transfer of heat energy.

It is a further object of the present invention to provide a system as aforesaid which is particularly suited for use in solar energy collection.

It is yet a further object of the present invention to provide a system as aforesaid which is contained within a single metal panel and is efficiently designed to allow maximum utilization of internal passageway systems for solar energy collection.

Further objects and advantages will become apparent to those skilled in the art as a detailed description proceeds with reference to the following drawings.

DETAILED DESCRIPTION

In accordance with the present invention, the foregoing objects and advantages are readily attained.

The system of the present invention is provided with a flow regulating mechanism in the form of at least one constriction provided in at least one connecting portion extending at least a portion of the length of said connecting portion which serves to regulate the flow of heat exchange medium between the connecting portions extending from and between the opposed header structures or manifolds.

The present invention deals with the problem of nonuniform flow resulting from excessive pressure drop occurring under the turbulent operating conditions to which the heat exchange systems are subjected. Specifically, the systems are conventionally installed in the vertical plane whereby the inlet opening is located above the connecting portions. Fluid flows at a rate accelerated by gravity from the header into the entry portions, where it is then split into a plurality of channels defined by the remainder of the connecting portions to follow through the system. As noted earlier, nonuniform flow often results from irregularities in the size and shape of the connecting portions because of the pressure drop which develops therein. This pressure drop, in certain instances, causes air pockets to develop which impede the movement of heat exchange fluid. To this end, the provision of controlled restriction in the internal diameter of the connecting portions by the employment of the present invention serves to efficiently distribute fluid flow and prevent the development of the detrimental pressure differential.

Figure 1:
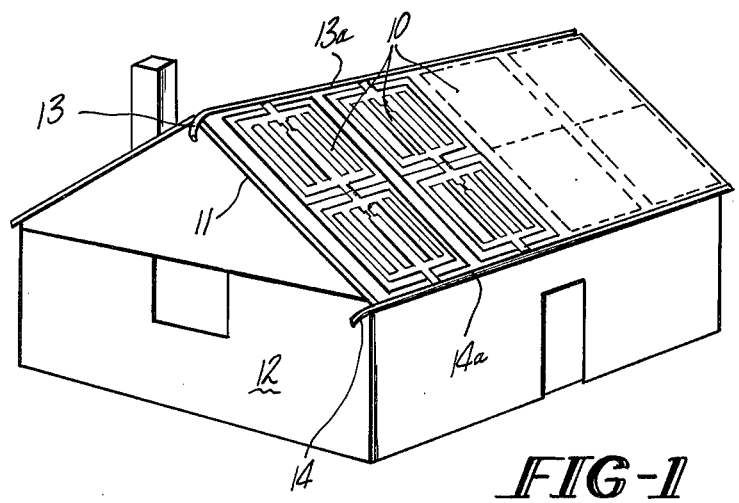
FIG. 1 is a diagram schematically depicting a heat exchange system representative of the present invention.
Figure 8:
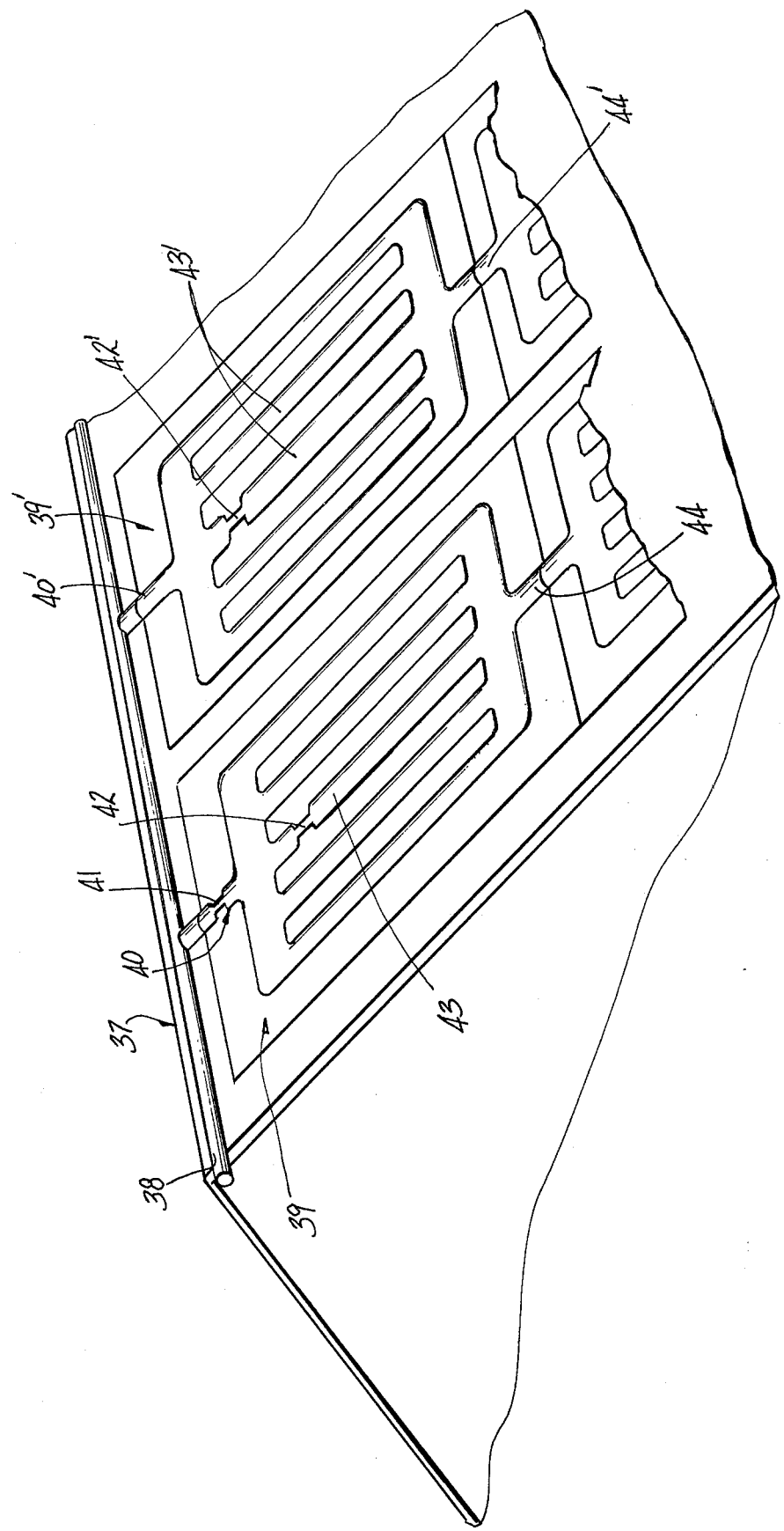
FIG. 8 is a blown-up perspective view showing the system of FIG. 1 in greater detail utilizing as connecting portions the panel of FIG. 5.

The present invention is preferably utilized as a solar heating system as shown in FIG. 1, and in greater detail in FIG. 8, wherein a plurality of panels of the present invention 10 are mounted on roof 11 of building 12 with conduits 13 and 14 connected in any convenient fashion to the equipment in the building, with the connections not shown. Thus, for example, cold water may go into conduit 13 from the building 12 by means of a conventional pump or the like. The water flows from conduit 13 to common manifold or header structure 13a and is distributed into a plurality of parallel-directed connecting portions of said system comprising in the illustration panels 10. The water flows through panels 10, is heated by means of solar energy, is collected in common manifold or header structure 14a and flows into conduit 14. The heated water is then stored or utilized in a heat exchange system inside the building in a known manner. Naturally, if desired, the water flow may be reversed with the cold water entering via conduit 14 and collected via conduit 13. Alternatively, the solar heating unit of the present invention may be used or placed in any suitable environment, such as on the ground with suitable fasteners to prevent displacement by wind or gravity.

The solar heating unit of the present invention may be used for residential heating purposes, such as in providing hot water in a residential environment. For example, three of the illustrated panels having dimensions of 8 feet × 4 feet would efficiently supply an average household of four with hot water for home use. Alternatively, the system of the present invention may be conveniently used for heating water for swimming pools or for preheating water for domestic gas or oil fired domestic hot water heaters. The fluid is preferably retained in a closed system with the water in the system heated in the solar unit and delivered into an insulated cistern or container so that the heated fluid may be stored up during sunshine for use on cool cloudy days or at night when the heating of the fluid in the panel will not be of sufficient degree to provide the desired heat at the point of use.

A thermostat not shown in desirably installed at the top of the solar heater and this thermostat may be set to turn on a circulating pump whenever the temperature reaches a predetermined reading. The pump will then pump the water through the system as generally outlined above.

Figure 2:
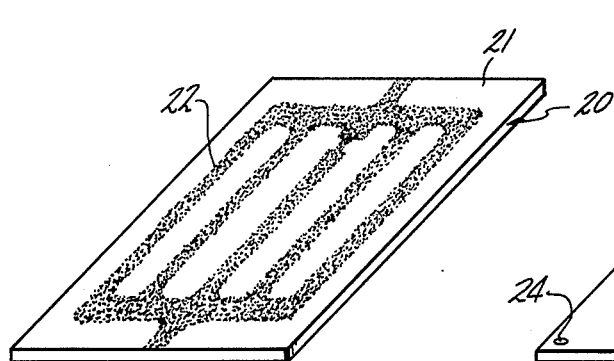
FIG. 2 is a perspective view of a sheet of metal having a pattern of weld-inhibiting material applied to a surface thereof.
Figure 3:
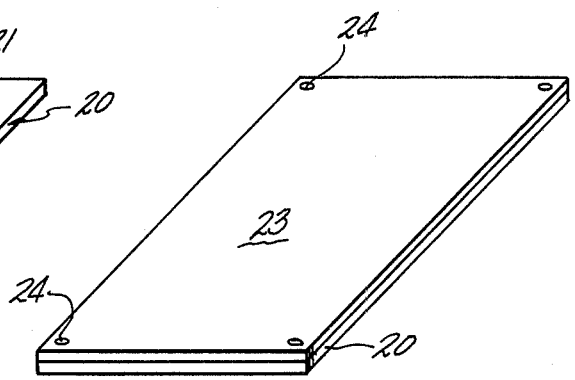
FIG. 3 is a perspective view of a composite metal blank wherein a second sheet of metal is superimposed on the sheet of metal shown in FIG. 2 with the pattern of weld-inhibiting material sandwiched therebetween.
Figure 4:
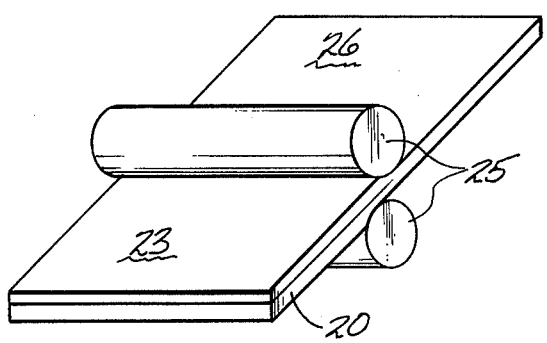
FIG. 4 is a schematic perspective view showing the sheets of FIG. 3 being welded together while passing through a pair of mill rolls.
Figure 5:
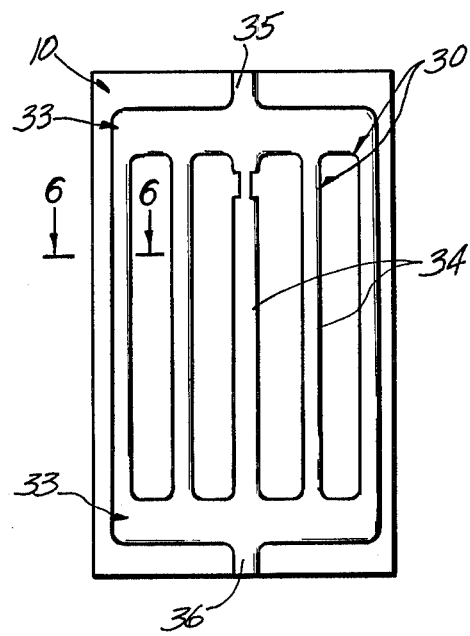
FIG. 5 is a top view showing a panel useful in the present invention having internal tubular passageways disposed between spaced apart portions of the thickness of the panel in the areas of the weld-inhibiting material.
Figure 7:
FIG. 7 is an alternate view showing a variation in the tube configuration similar to the view of FIG. 6.
Figure 6:
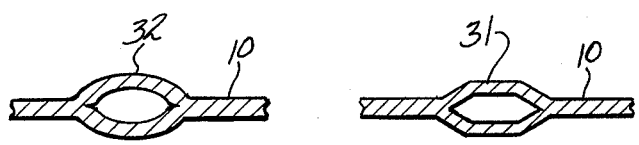
FIG. 6 is a sectional view taken along lines 6—6 of FIG. 5.

As indicated above, the present invention may employ as the energy collector structure, one or more connecting portions comprising a metal panel of a particularly preferred design and construction for optimum efficiency in the solar heating system as described above. The metal panel is desirably fabricated by the ROLL-BOND ® process as shown in U.S. Pat. No. 2,609,002. FIG. 2 illustrates a single sheet of metal 20 as aluminum or copper or alloys thereof, having applied to a clean surface 21 thereof a pattern of weld-inhibiting material 22 corresponding to the ultimate desired passageway system. FIG. 3 shows the sheet 20 having superimposed thereon a second sheet 23 with a pattern of weld-inhibiting material 22 sandwiched between the units. The units 20 and 23 are tacked together as by support welds 24 to prevent relative movement between the sheets as they are subsequently welded together as shown in FIG. 4 by passing through a pair of mill rolls 25 to form welded blank 26. It is normally necessary that the sheets 20 and 23 be heated prior to passing through the mill rolls to assure that they weld to each other in keeping with techniques well known in the rolling art. The resultant blank 26 is characterized by the sheets 20 and 23 being welded together except at the area of the weld-inhibiting material 22. The blank 26 with the unjoined inner portion corresponding to the pattern of weld-inhibiting material 22 may then be softened in any appropriate manner as by annealing, and thereafter the bank may be cold rolled to provide a more even thickness and again annealed. The portions of the panel adjacent the weld-inhibiting material 22 are then inflated by the introduction of fluid distending pressure, such as with air or water, in a manner known in the art to form a system of internal tubular passageways 30 corresponding to the pattern of weld-inhibiting material, as shown in FIG. 5. Internal passageways 30 extend internally within panel 10 and are disposed between spaced apart portions of the thickness of said panel. Thus, panel 10 comprises a hollow sheet metal panel or plate having a system of internal fluid passageways 30 for a heat exchange medium extending internally therein. If the passageways are inflated by the introduction of fluid distending pressure between flat die platens, the resultant passageways have a flat topped configuration 31 as shown in FIG. 6. If, on the other hand, passageways 30 are formed without the presence of superimposed platens, the resultant passageway configuration has a semicircular shape 32 as shown in FIG. 7.

As shown in FIG. 5, internal passageways 30 include opposed internal headers 33 connected by internal connecting portions 34 of said passageways extending substantially longitudinally in panel 10 between headers 33 and interconnecting same, with the opposed headers 33 extending in a direction substantially tranverse to said longitudinal passageways. Preferably, opposed internal headers 33 are connected by a plurality of spaced, parallel individual internal connecting portions 34 of said passageways extending between the headers. Also passageways 30 include entry and exit portions 35 and 36, respectively, extending from internal headers 33 to provide ingress and egress openings for the heat exchange medium.

In accordance with the present invention, the system depicted in FIG. 1 is shown in greater detail in the perspective view of FIG. 8 to comprise an inlet manifold or header structure which connects at a plurality of locations along its length to a connecting portion comprising a panel possessing a configuration similar to that of panel 10 illustrated in FIG. 5. System 37, shown here installed on the roof of a building structure, comprises an inlet header structure 38 which connects at a plurality of locations to panels 39 and 39' which serve as the connecting portions of the system. Panel 39 is provided with at least one constriction in internal diameter residing along at least a portion of the passageways comprising panel 39, and, as illustrated herein, as two such constrictions, one of which comprises constriction 41 located along entry portion 40, and the other of which comprises constriction 42 located along internal connecting portion 43. Both constrictions 41 and 42 serve in the same generic capacity, as both assist in reducing pressure drop by regulating the distribution of fluid between the various connecting portions in the system. Thus, constriction 41 assists in the regulation of fluid distribution between the various panels which may comprise the connecting portions within system 37, while constriction 42 provides a similar regulation of fluid flow between the several internal connecting portions 43 contained within panel 39.

In both instances, the respective constrictions are pictured in closest proximity to the area of greatest turbulence and fluid flow as it has been found that the provision of the constriction at this point serves to divert fluid away from the connecting portion receiving the primary amount of flow, to laterally displaced connecting portions which would ordinarily receive a lesser amount of such flow. Thus, in FIG. 8, constriction 41 is located in the entry portion of panel 39 closest to the origin of fluid flow in manifold or header structure 38, since turbulence decreases as the fluid passes through header structure 38 to laterally displaced panel 39'. Correspondingly, the provision of constriction 42 adjacent entry portion 40 serves to divert fluid away from the central-most connecting portion 43 to laterally displaced connecting portions. Though constrictions 41 and 42 are illustrated as singular structures in FIG. 8, and in the several figures in which such constrictions are shown, it is to be understood that a plurality of such constrictions could be employed in a variety of locations to provide precise control over fluid flow among the various connecting portions in the system, including the internal connecting portions provided in the respective panels when employed therein.

As noted above, the theory of operation of the constriction in the system of the present invention is that the creation of a minor pressure drop within those connector portion or portions which tend to experience the greatest volume and rate of fluid flow will compensate for and thereby reduce or totally eliminate the pressure drop experienced by those connector portions which are laterally displaced from the area of greatest turbulence and fluid flow. Specifically, fluid entering entry portions 40 and 40' must travel a greater distance to reach exit portions 44 and 44' as depicted at the lowermost ends of panels 39 and 39', as it is required to move laterally to outermost internal connecting portions 43 and 43' in its travel. Similarly, a greater distance of travel through the system is involved when fluid is diverted to panel 39' from panel 39. This greater distance promotes the increased pressure drop through the outermost connector portion, which the present invention proposes to alleviate.

As noted briefly earlier, constrictions 41 and 42 are merely representative of their illustration in FIG. 8, as variations in internal diameter, length, and location on or within a particular connecting portion may be varied to suit the flow conditions attending the particular application in which the system may be employed. Thus, constrictions 41 and 42 may be located at the opposite end of panel 39 or may extend the entire length of the structures in which they are located. Likewise, as noted earlier, the exact internal diameter of the constrictions may vary depending upon both the ultimate application and the design of the system in which they are to be employed.

Panels which may be employed in the present invention may assume a wide variety of configurations while embodying the feature of at least one constriction in internal diameter located within at least one of the internal connecting portions of said passageways. Specifically, referring to FIG. 9, panel 45 is depicted which generally resembles panel 10 in its gross configuration. Panel 45 is modified by the provision of internal headers 46 which are inclined with respect to the direction of fluid flow, corresponding in this instance, to the longitudinal dimension of the panel. Specifically, headers 46 are inclined at an angle of at least 91°, and preferably 92 to 100° with respect to longitudinal edge 47 of panel 45. The aforementioned angle, labeled $\alpha$, is actually measured in relation to entry portion 48 and exit portion 49, respectively. This configuration has been found to enhance fluid flow and exit drainage through the passageways of the panel, thereby preventing air locks and sediment collection due to fluid stagnation.

In addition to the provision of headers 46 at the aforementioned angle $\alpha$, panel 45 possesses the additional feature of the provision within headers 46 of a plurality of bonded portions 50 of the metal which are welded together and provide increased header strength, improved fluid flow control and directionality and interruption in the flow of heat exchange fluid. Bonded portions 50 are easily provided by the omission of weld preventive material at the designated places within the header pattern.

Figure 9:
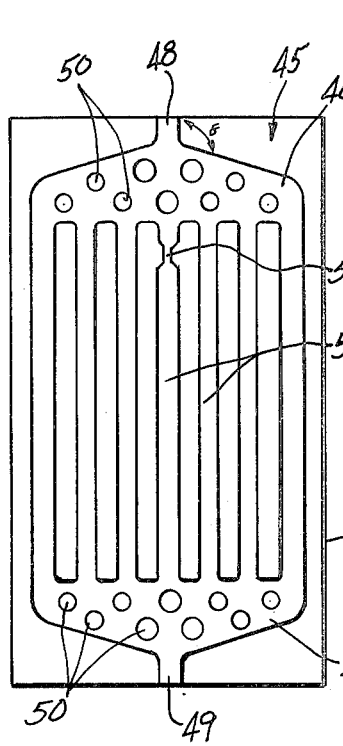
FIGS. 9–13 are top views showing alternate embodiments of the invention illustrated in FIG. 5.

Referring further to FIG. 9, panel 45 likewise is provided with a plurality of internal connecting portions 51 extending between headers 46, wherein the central-most connecting portion, likewise most adjacent entry portion 48 is provided with a constriction 52 in its internal diameter to further enhance fluid distribution. It can thus be seen that the design of the panel of FIG. 9 integrates the features of the angled headers 46, bonded portions 50 and constriction 52 to improve fluid flow and heat exchange efficiency.

As can be seen from the figures, the panels of FIGS. 5, 8, 9 and 11 are designed whereby the entry and exit portions intersect their respective internal headers at the center thereof and are in line with each other. This symmetrical design renders the panels easier to handle and install, as the panels may be placed so that either end thereof may serve as the entry or upper portion. In this connection, as noted earlier, the location of the constriction in the internal connecting portion or portions is not critical, as the panel may clearly be employed in a wide variety of positions. The provision of the constriction results in improved fluid distribution regardless of its location along the connecting portion.

Figure 10:
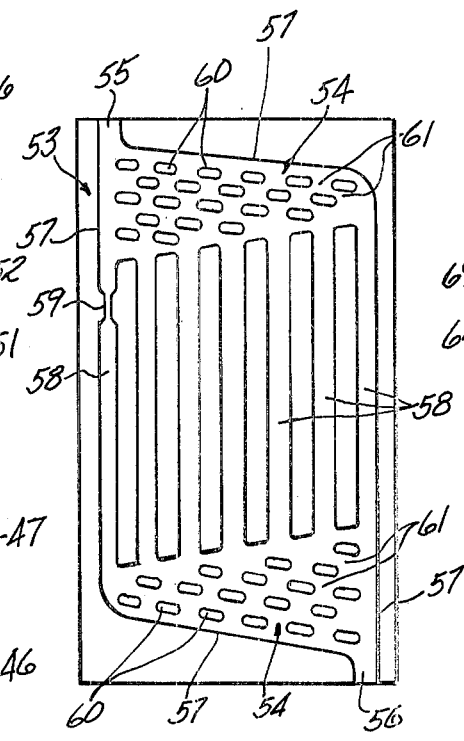
Figure 12:
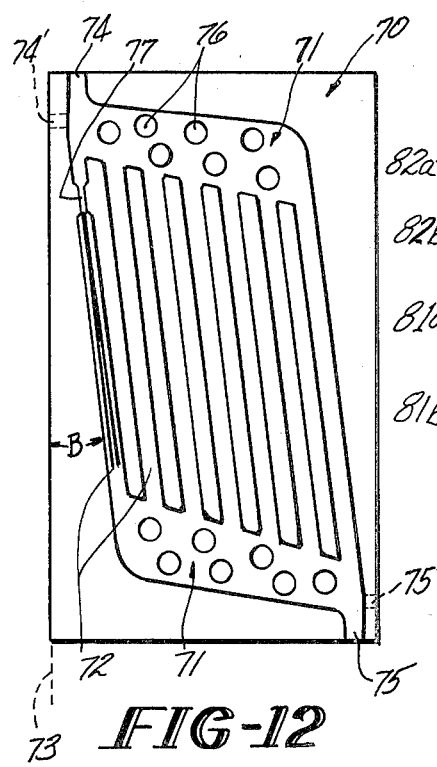

The present invention may also be advantageously employed in panels where the entry and exit portions intersect their respective internal headers at opposite ends thereof, as illustrated herein in FIGS. 10 and 12. In such an instance, the constriction in the connecting portion is preferably located adjacent the entry portion and/or an area where, by virtue of the design of the panel, the preponderance of turbulence and fluid flow will appear to reside. Turning to FIG. 10, panel 53 comprises such a design where internal headers 54 are provided in opposed relationship to each other and are so configured that entry portion 55 and exit portion 56 extend from opposite sides of their respective headers. A further feature of panel 53 resides in the configuration of headers 54 wherein the headers are provided in an essentially triangular shape which is partially defined by boundary sides 57 which define a part of the outer perimeter of the panel pattern, as well as two of the three borders of the header structure.

Boundary sides 57 are continuous with entry portion 55 and exit portion 56, whereby the longitudinal dimension of at least one of respective sides 57 resides in substantially the same plane as that containing the longitudinal dimension of the respective portions. In the illustration of FIG. 10, the respective longitudinal dimensions of sides 57 and the entry and exit portions lie in the same longitudinal plane.

The advantage conferred by this arrangement is that the greatest depth or capacity of internal header 54 is placed closest to the area of greatest turbulence and flow, that being the locus of entry and exit or heat exchange fluid. Thus, for example, fluid entering entry portion 55 encounters the greatest depth of header 54 as defined by vertically extending side 57. As panel 53 is generally employed in the upright position wherein the top edge comprises the location of entry portion 55, the primary direction of flow is naturally dictated by gravity to be vertically downward by the most direct route. Thus, fluid entering at portion 55 tends to travel directly down through vertically adjacent internal connecting portions 58, and, as said connecting portions become filled, tends to spill over to laterally displaced parallel connecting portions.

Referring further to FIG. 10, connecting portions 58 are provided with a constriction 59 located in the internal connecting portion 58 most adjacent entry portion 55 whereby the connecting portion 58 vertically adjacent entry portion 55 is provided with a pressure drop serving to distribute fluid in the direction of the internal connecting portions which are laterally displaced from said entry portion. Again, though only one constriction 59 is illustrated, it is intended that the size and number of such constrictions can be varied to achieve the desired distribution. Thus, in the panel of FIG. 10, as well as in all other panels illustrated herein, a series of constrictions can be provided which define a gradient of internal diameters specifically devised to establish uniform flow throughout the various connecting portions.

A further feature of the particular panel illustrated in FIG. 10 is the provision of bonded portions 60 which are elongated in shape and which are aligned to define parallel-directed fluid channels 61 integral with said internal connecting portions and running substantially transverse thereto, which serve to assist in the lateral displacement of heat exchange fluid to respective internal connecting portions 58. Though illustrated as oblong or substantially rectangular in shape, bonded portions 60 may assume a wide variety of shapes to provide the parallel channels 61 desired and employed herein.

Figure 11:
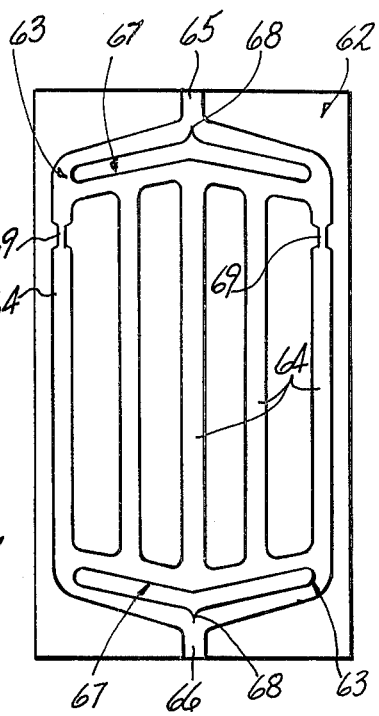

A further embodiment of the present invention is illustrated in FIG. 11 wherein panel 62, comprising opposed internal headers 63 connected by internal connecting portions 64 extending therebetween, and entry portion 65 and exit portion 66 extending from the opposite sides thereof, is provided with a fluid distribution pattern within headers 63 comprising bonded portion 67. Though the description and accompanying illustration refer to a single bonded portion, it is to be understood that the invention is not limited thereby, as patterns are contemplated which, for example, may comprise a plurality of bonded portions and headers of various configurations. Bonded portion 67 defines as least one point along its perimeter comprising a wedge-shaped projection 68 which assists in the distribution of flow of the heat exchange medium. Projections 68 are respectively located adjacent and in juxtaposition to entry portion 65 and exit portion 66 in FIG. 11 as an illustration of one of the features of the invention. The positioning of a projection 68 particularly with respect to entry portion 65 facilitates the proportionate division of the incoming stream of fluid into two discrete fluid channels. Further, the provision of bonded portion 67 serves to maintain each channel under a uniform pressure which assists in overcoming the aforenoted problem of pressure drop. Fluid thus leaving the area of internal header 63 is permitted to flow evenly and rapidly into respective internal connecting portions 64. Likewise, the provision of bonded portion 67 near exit portion 66 likewise assists in preventing the development of pressure drop as the fluid medium reaches the opposite end of panel 62.

Panel 62 is provided with a pair of constrictions 69 located at the lateral-most connecting portions 64 adjacent header 63 associated with entry portion 65. As bonded portions 67 effectively divide the entry fluid into two streams within internal header 63, the provision of constrictions 69 adjacent the lateral ends of header 63 and bonded portion 67 places the constriction in the position most nearly adjacent entry portion 65. Thus, the inducement of a slight pressure drop in the lateralmost internal connecting portions assists in diverting fluid to the central-most connecting portions which, in panel 62, are further displaced from entry portion 65. It is thus seen that the provision of constrictions 69 in conjunction with bonded portions 67 serves to assure a uniformity of fluid flow within panel 62 that effectively prevents the occurrence of pressure drop within the panel.

Referring now to FIG. 12, a further embodiment of the present invention is illustrated wherein panel 70 employs internal headers 71 which are disposed at an angle labeled α corresponding to an angle ranging from 91° to 100°, as disclosed with respect to angle α in FIG. 9. In addition, panel 70 possesses internal passageways 72 which are likewise disposed at an angle labeled β with respect to the longitudinal dimension of the panel as defined by a longitudinal edge thereof, extended in phantom and labeled 73. This angle β is at least 1° with respect to longitudinal edge 73, generally ranges from 2° to 10°, and preferably is from 2½° to 7½°. The provision of angle β in conjunction with angle α establishes corresponding inclines in both the internal headers 71 and the internal connecting portions 72 which enables panel 70 to provide efficient drainage regardless of the plane in which the panel is mounted. Thus, it can be visualized that the panel may be rotated 90° whereby entry portion 74 and exit portion 75 are relocated to the respective entry portion 74' and exit portion 75' shown in phantom. Thus, panel 70 confers a greater versatility of location as it can be mounted in either a horizontally extended or a vertically extended position while maintaining a desirable level of fluid flow and drainage. Naturally, bonded portions 76 situated in headers 71 confer increased header strength, improved fluid flow and directionality.

As with the previous panels discussed, panel 70 is provided, within the connecting portions 72 most adjacent entry portion 74, with a constriction 77 which further assists in the distribution of fluid to connecting portions 72 conventionally experiencing the greatest pressure drop. Though constriction 77 is illustrated as a single such constriction located on the connecting portion 72 most adjacent entry portion 74, it is to be understood that the dynamics of panel 70 may in fact dictate that constrictions 77 be placed elsewhere, as perhaps fluid flow may concentrate primarily in the connecting portion most laterally displaced from entry portion 74. Such modifications are considered within the scope of the invention as defined and expressed herein.

Figure 13:
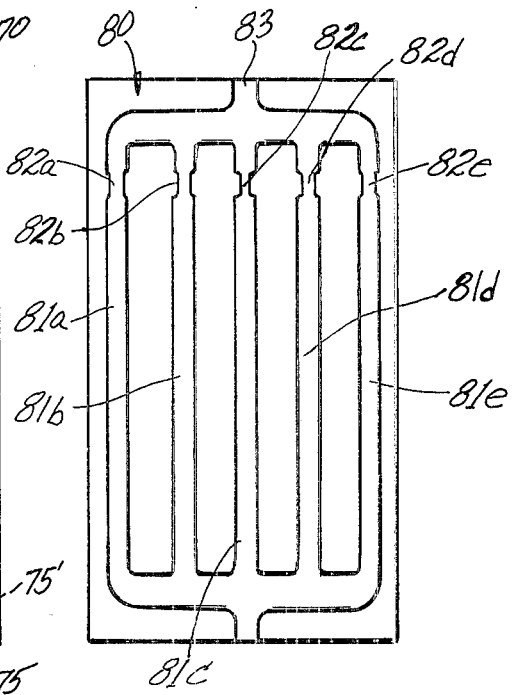

As noted earlier, the foregoing discussion and illustration has dealt with the provision of at least one constriction extending along at least a portion of at least one connecting portion within a heat exchange system and/or panel as defined earlier. It is therefore contemplated that a plurality of such constrictions may be provided in several or all of the connecting portions present in a given panel of such size that an accurate metering of fluid can be achieved to totally eliminate pressue drop therefrom. Thus, referring now to FIG. 13, panel 80 similar in basic design to that of panel 10 of FIG. 5, is illustrated with internal connecting portions 81a, 81b, 81c, 81d and 81e each provided with a constriction 82a, 82b, 82c, 82d and 82e. From the figure, it is apparent that the constriction provided on connecting portion 82c most adjacent entry portion 83 effects the greatest reduction in internal diameter. The constrictions 82b and 82d provided on internal connecting portions 81b and 81d immediately laterally adjacent central connecting portion 81c are equal in internal diameter and are slightly larger than that of the central-most constriction 82c. Likewise, the lateral-most constrictions 82a and 82e are of an equal diameter that is greater in size than that of the next adjacent constrictions. This apparent gradation in internal diameter of constrictions serves to provide a close control over the amount of fluid flow that each connecting portion will entertain.

As noted earlier, further variations in the present invention would include the extension of the constrictions in length from the portions illustrated in the figures to the full length of the entry or exit portions in the case of the system, or the internal connecting portions in the individual panel as shown in FIG. 12 where constriction 77 extends substantially the entire length of the internal connecting portion. Also, though the panel of FIG. 13 suggests that a uniform graduation of constriction sizes may be employed, this size differential may be instituted at random to achieve particular flow effects in given situations requiring same.

The internal connecting portions provided in the panels prepared in accordance with the present invention may, in a preferred embodiment comprise a plurality of spaced parallel individual passageways extending between the respective headers. This preferred configuration is illustrated in the accompanying figures, however the invention is not limited thereto, as connecting portions displaced at slight angles with respect to each other might be employed.

It can be seen that the present invention contemplates a wide variety of heat exchange systems, extending from those employing a single collector panel in the path of fluid circulation to installations of a multiplicity of panels or other fluid connections, where the path of flow and thus the exposure to heat exchange can vary greatly within the system itself. In all instances, the concepts of the present invention are clearly pertinent and useful.

Naturally, further alternative designs may be envisioned by one skilled in the art in accordance with the concepts described above.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A heat exchange system for use in a solar energy collector system comprising a plurality of passageways for a heat exchange medium defining opposed header structures connected by a plurality of spaced, parallel individual connecting portions of said passageways extending therebetween, said passageways having entry and exit portions extending from said header structures to provide ingress and egress openings for said heat exchange medium, wherein said connecting portions are provided with a plurality of constrictions in internal diameter extending along at least a portion of the length thereof wherein at least some of said constrictions have differing internal diameter so that the constriction adjacent the area of greatest turbulence and fluid flow has the smallest internal diameter over at least a portion of its length and the constriction on individual connecting portions have gradually increasing internal diameter in relation to increased distance from said area of greatest turbulence, said constrictions serving to divert fluid away from the connecting portion receiving the primary amount of flow and to regulate the rate of flow of said heat exchange medium between all of said connecting portions.

2. The system of claim 1 wherein at least one of said constrictions is located along at least a portion of said entry portion.

3. The system of claim 1 wherein at least one of said constrictions is located along at least a portion of said exit portion.

4. The system of claim 1 wherein at least one of said connecting portions comprises a metal panel, said panel defining a system of internal tubular passageways for said heat exchange medium.

5. In a solar energy collector system including at least one heat exchange panel possessing a system of internal tubular passageways defining opposed headers connected by a plurality of spaced, parallel individual connecting portions of said passageways extending therebetween, said passageways including entry and exit portions extending from opposite ends of said headers to provide ingress and egress openings for a heat exchange medium, the improvement which comprises providing said connecting portions with a plurality of constrictions in internal diameter extending along at least a portion of the length of thereof wherein at least some of said constrictions have differing internal diameter so that the constriction adjacent said entry portion has the smallest internal diameter over at least a portion of its length and the constrictions on individual connecting portions have gradually increasing internal diameter in relation to increased distance from said entry portion, said constrictions serving to divert fluid away from the connecting portion adjacent said entry portion to regulate the rate of flow of said heat exchange medium between said connecting portions.

6. A metal panel for use in a solar energy collector system having a desired system of internal tubular passageways for a heat exchange medium disposed between spaced apart portions of the thickness of said panel and defining opposed internal headers connected by a plurality of spaced, parallel individual internal connecting portions of said passageways extending therebetween, said internal passageways having entry and exit portions extending from said internal headers to opposed edges of said panel to provide ingress and egress openings for said heat exchange medium, wherein said connecting portions are provided with a plurality of constrictions in internal diameter extending along at least a portion of the length thereof wherein at least some of said constrictions have differing internal diameter so that the constriction adjacent said entry portion has the smallest internal diameter over at least a portion of its length and the constrictions on individual connecting portions have gradually increasing internal diameter in relation to increased distance from said entry portion, said constrictions serving to divert fluid away from the connecting portion adjacent said entry portion to regulate the rate of flow of said heat exchange medium between all of said connecting portions.

7. The panel of claim 6 wherein at least one of said constrictions extends substantially the length of said connecting portion.

8. The panel of claim 6 wherein said headers include a fluid distributing pattern comprising at least one bonded portion defining at least one wedge-shaped projection, said projection provided to assist in the distribution of flow of said heat exchange medium.

9. The panel of claim 6 wherein the header and entry portion extending therefrom are located above the connecting portions.

10. The panel of claim 6 wherein at least one of said constrictions is located on the connecting portion most adjacent said entry portion.

11. The panel of claim 10 wherein said entry and exit portions are centrally displaced along said header and at least one of said constrictions is located on the centralmost connecting portion.

12. The panel of claim 6 wherein said headers define an angle of at least 91° with respect to the direction of flow of said heat exchange medium in said panel.

13. The panel of claim 12 wherein said headers define an angle of from 92° to 100° with respect to said direction of flow of said heat exchange medium.

14. The panel of claim 6 wherein said entry portion and said exit portion extend from the opposite sides of respective opposed headers.

15. The panel of claim 14 wherein said headers are triangular in shape and possess a plurality of parallel fluid channels communicating with said connecting portions and running in a direction substantially transverse thereto.

16. The panel of claim 6 wherein said connecting portions define an angle of at least 1° with respect to a longitudinal edge of said panel.

17. The panel of claim 16 wherein said connecting portions define as angle of from 2 to 10° with respect to said longitudinal edge of said panel.

* * * * *